United States Patent [19]

Astheimer

[11] Patent Number: 4,628,206
[45] Date of Patent: Dec. 9, 1986

[54] VISIBLE-UV HORIZON SENSOR

[75] Inventor: Robert W. Astheimer, Westport, Conn.

[73] Assignee: Barnes Engineering Company, Stamford, Conn.

[21] Appl. No.: 644,549

[22] Filed: Aug. 27, 1984

[51] Int. Cl.[4] .............................................. G01J 1/42
[52] U.S. Cl. ................................................... 250/372
[58] Field of Search ................................ 250/372, 352

[56] References Cited

U.S. PATENT DOCUMENTS

| | | | |
|---|---|---|---|
| 3,418,478 | 12/1968 | Falbel | 250/342 |
| 3,657,549 | 4/1972 | Low et al. | 250/372 |
| 3,715,594 | 2/1973 | Drohan et al. | 250/372 |
| 4,233,501 | 11/1980 | Strother | 250/216 |
| 4,328,421 | 5/1982 | Falbel | 250/347 |

*Primary Examiner*—Carolyn E. Fields

*Attorney, Agent, or Firm*—Parmelee, Bollinger & Bramblett

[57] ABSTRACT

A visible-ultraviolet horizon sensor and a method for using the same are provided for obtaining attitude information from a satellite. A plurality of detectors selectively responsive to scattered sunlight in the visible and ultraviolet spectral bands view the earth's disc at a plurality of equally spaced locations around the earth. The detectors are scanned across the earth's disc at a plurality of locations thereby generating electrical signals in response to the intensity of visible-ultraviolet radiation from the crescent or fully illuminated earth's disc. Logic circuitry is provided for processing the electrical signals applied thereto from the detectors for producing attitude information for the satellite which is indicative of the satellite's position with respect to the earth.

7 Claims, 5 Drawing Figures

VISIBLE-UV HORIZON SENSOR

BACKGROUND OF THE INVENTION

This invention relates to an improved no moving parts horizon sensor, and more particularly, to such a sensor which detects and provides attitude information in response to the intensity of visible and ultraviolet radiation from the crescent or fully illuminated earth disc produced by scattered radiation from the sun.

Horizon sensors are commonly used in satellites and space craft for maintaining level flight or providing predetermined attitudes of components mounted or positioned in the host vehicle. The horizon sensor operates by sensing the sharp line of thermal discontinuity which is presented between the earth's horizon and outer space. Horizon sensors primarily utilized infrared radiation by comparing the practically zero level of infrared radiation in space with the enormous or substantial quantity of infrared radiation emitted by the earth. Detectors are provided which are responsive to such radiation and these detectors are scanned successively across the earth to outer space or vice versa and repeatedly provide horizon crossing information in the form of an electrical signal identifying the sharp line of thermal discontinuity. Various types of scanning mechanisms have been employed, for example, rotating mirrors, rotating prisms, the rotation of the satellite which rotates a fixed detecting means, as well as scanners in the form of detector arrays which are self scanned electronically.

In U.S. Pat. No. 3,118,063 horizon sensors were provided which were selectively responsive to infrared emission from a gaseous component in the atmosphere. In other words, radiation from the earth or the clouds either reflected or semi-emitted was not used which was a considerable improvement in horizon sensoring accuracy because the sensor was blind to radiation reflected from the clouds. Accordingly, no problem was presented by a false horizon caused by such radiation. Furthermore, the emission from the earth's crust is not uniform and varies depending on the location and the climatic conditions. However, the use of this gaseous component requires an infrared detector whose radiation must be chopped or interrupted before it is applied to a detector so that the detector can respond and generate a signal. The chopping mechanism requires moving parts which are a disadvantage with respect to operational life in space. The possibility of mechanical malfunction, as well as the power requirements to drive the chopper which adds to the weight required for the sensor are added disadvantages.

SUMMARY OF THE INVENTION

Accordingly, it is an object of this invention to provide a new and improved horizon sensor with no moving parts.

A further object of this invention is to provide a new and improved horizon sensor for use on synchronous altitude horizon sensors of low cost and high accuracy.

Still another object of this invention is to provide a new and improved method for providing attitude information by utilizing visible and ultraviolet radiation from the crescent or fully illuminated earth disc produced by scattered sunlight.

In carrying out this invention in one illustrative embodiment thereof, a visible-ultraviolet horizon sensor is provided having a plurality of detector means selectively responsive to scattered sunlight in the visible and ultraviolet spectral bands. Means are provided for scanning the plurality of detectors across the earth's disc at a plurality of locations whereby the detectors generate electrical signals in response to the intensity of the visible and ultraviolet radiation from the crescent or fully illuminated earth's disc formed from scattered sunlight. Circuit means have the electrical signals from the detectors applied thereto for producing attitude information for the satellite thereby providing the satellite's position with respect to the earth.

BRIEF DESCRIPTION OF THE DRAWINGS

The invention, together with further objects, aspects, features and advantages thereof will be more clearly understood from the following description taken in conjunction with the accompanying drawings which are diagrammatical to more clearly describe the principles of the invention.

DESCRIPTION OF THE PREFERRED EMBODIMENTS

Figure 1:
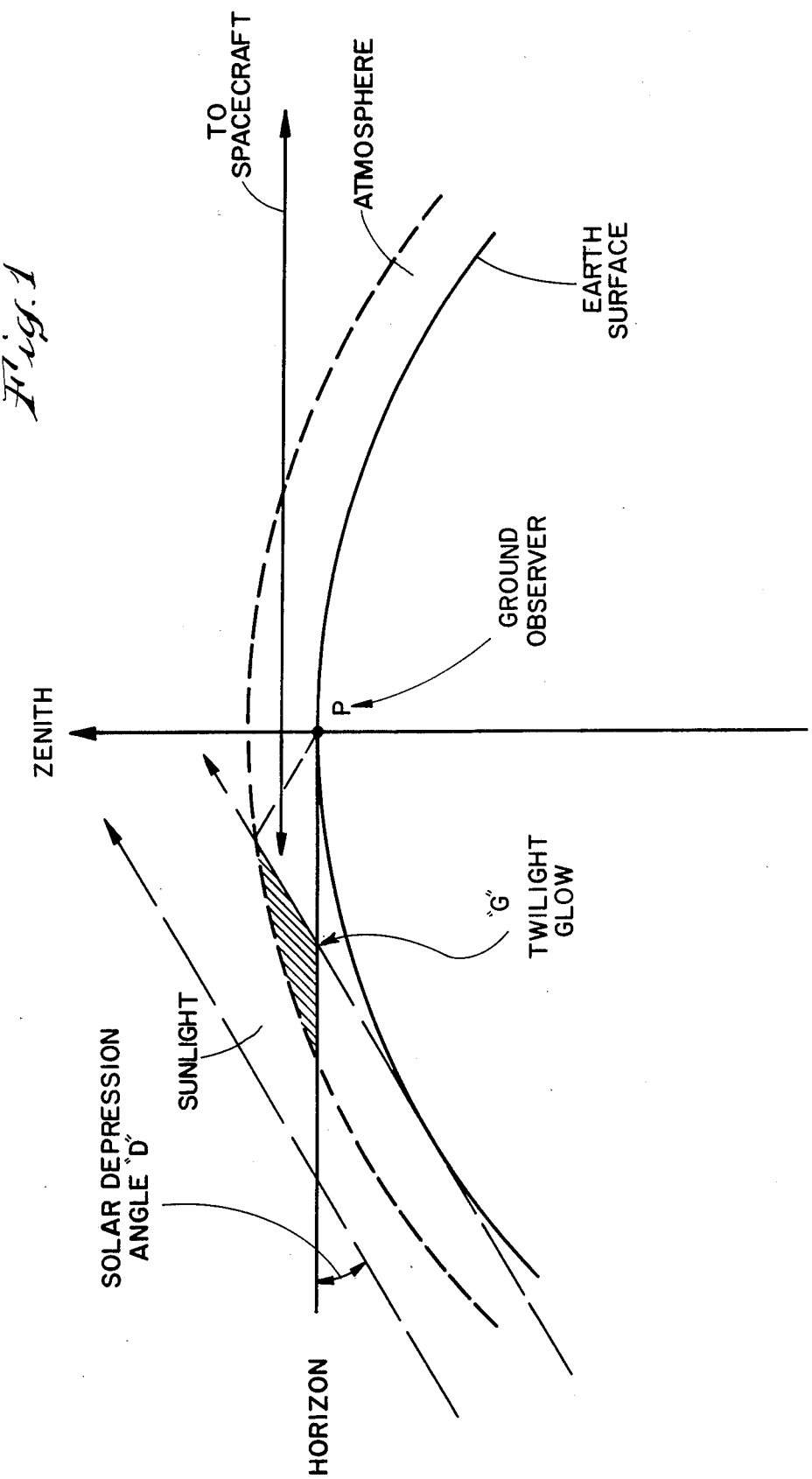
FIG. 1 is a diagrammatic illustration of twilight (shaded zone), the brightness of which will appear roughly the same to a surface observer at point P as to a distant spacecraft with the angular subtense much less to the spacecraft.

As has been pointed out, infrared detectors generally require mechanical scanning mechanisms to achieve high accuracy with wide angular range in horizon sensors. Shorter wavelength detectors operating in the visible and UV spectral regions do not require such mechanical scanning, and systems employing no moving parts are feasible. They depend on sunlight for operation and at night, at low altitudes, the horizon disappears, thus rendering them inoperative. The horizon does not immediately disappear after the sun sets because scattered light from illumination of the upper atmosphere produces a "twilight halo" which persists until the sun has set about 10° below the horizon as shown in FIG. 1. At low altitudes, this would only permit operation for a half to one hour after sunset and before sunrise. However at synchronous altitude of 22,000 miles where the earth only subtends 17.5°, the horizon can be detected throughout the night because of two effects.

Figure 2:
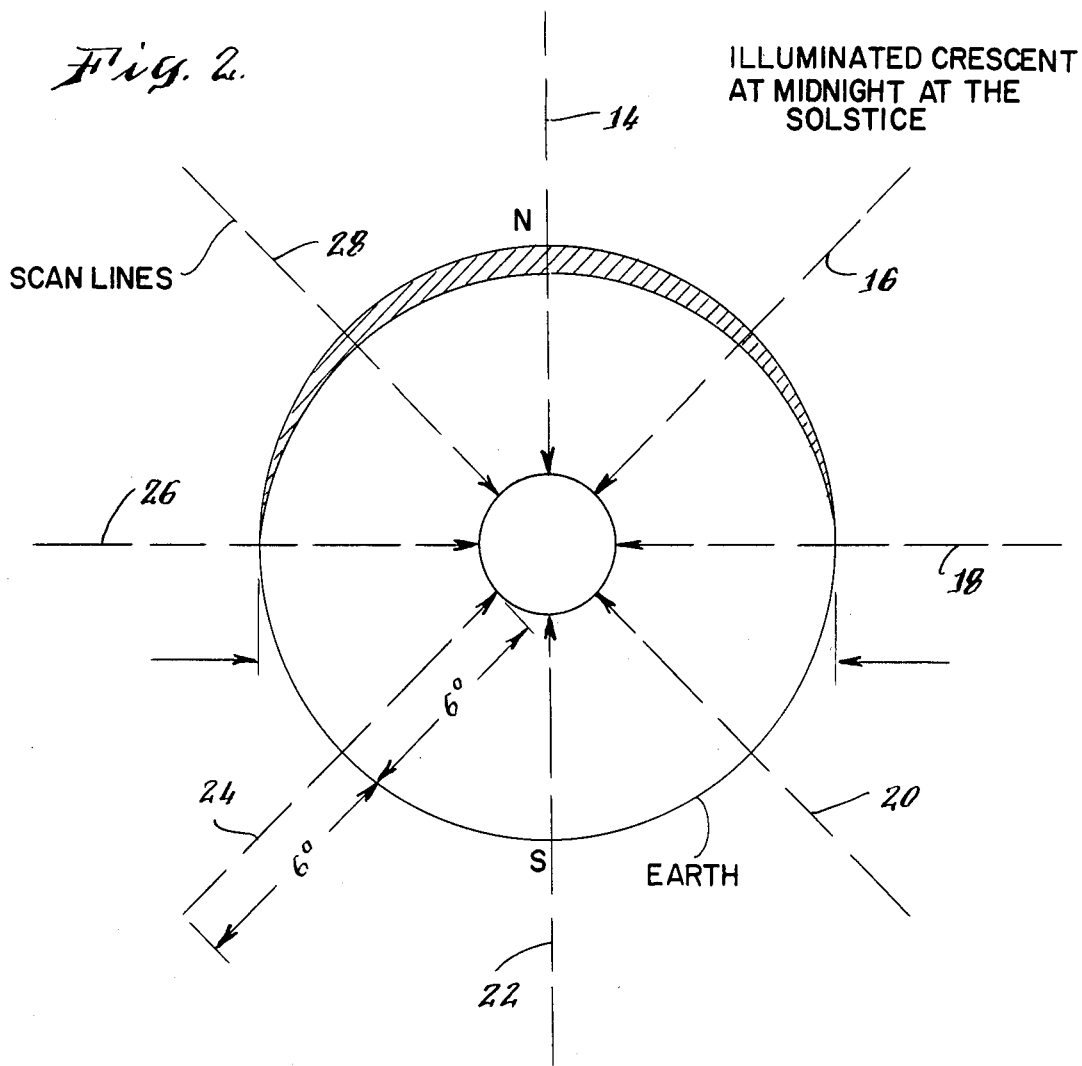
FIG. 2 is a diagrammatic illustration of the earth with an illuminated crescent at midnight at the solstice showing the scan lines which would be utilized for deriving positional signals for the horizon sensing function.
Figure 3:
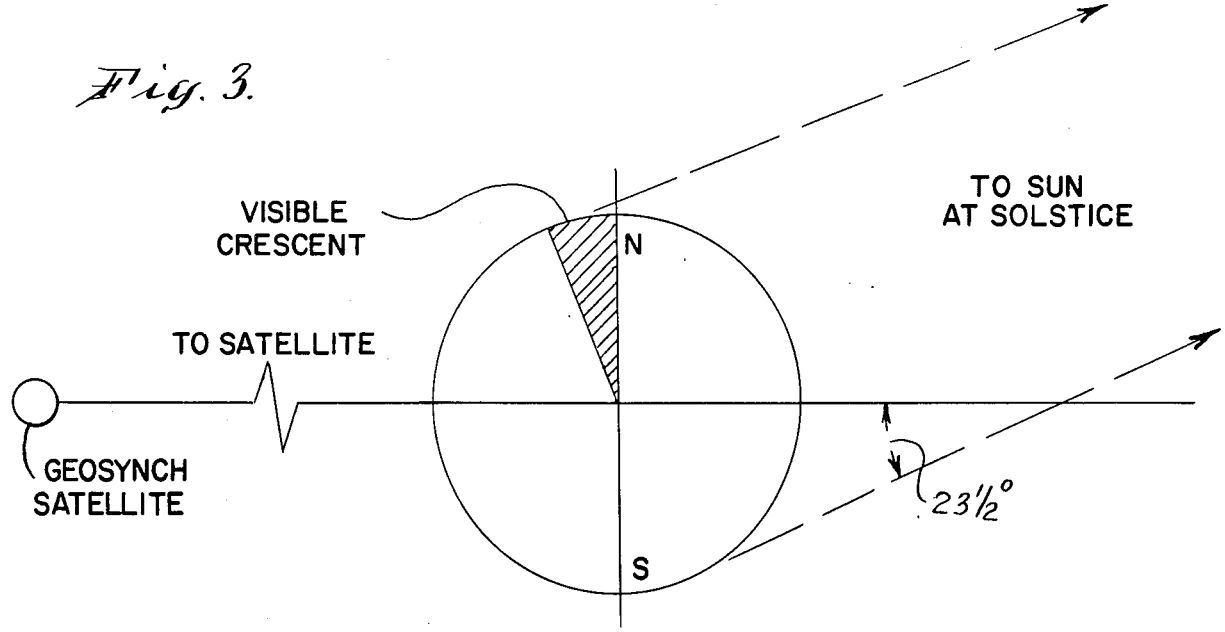
FIG. 3 shows the relationship of a satellite on which a horizon sensor in accordance with the present invention is positioned with respect to the earth and the sun at the solstice similar to FIG. 1.

The inclination of the earth's axis with the normal to the ecliptic is 23½° and, even at midnight, a crescent of the earth around one or the other pole will be illuminated by the sun for a period of several months either side of the solstices, as shown in FIGS. 2 and 3. A worst case condition occurs at midnight during the equinoxial period when the sun passes directly behind the center of the earth. At this time, the sun is only 8.75° below the horizon and there will be a halo of scattered light in the UV-blue spectral region extending around the disc of the earth as shown in FIG. 1, which permits accurate determination of the horizon location.

Figure 4:
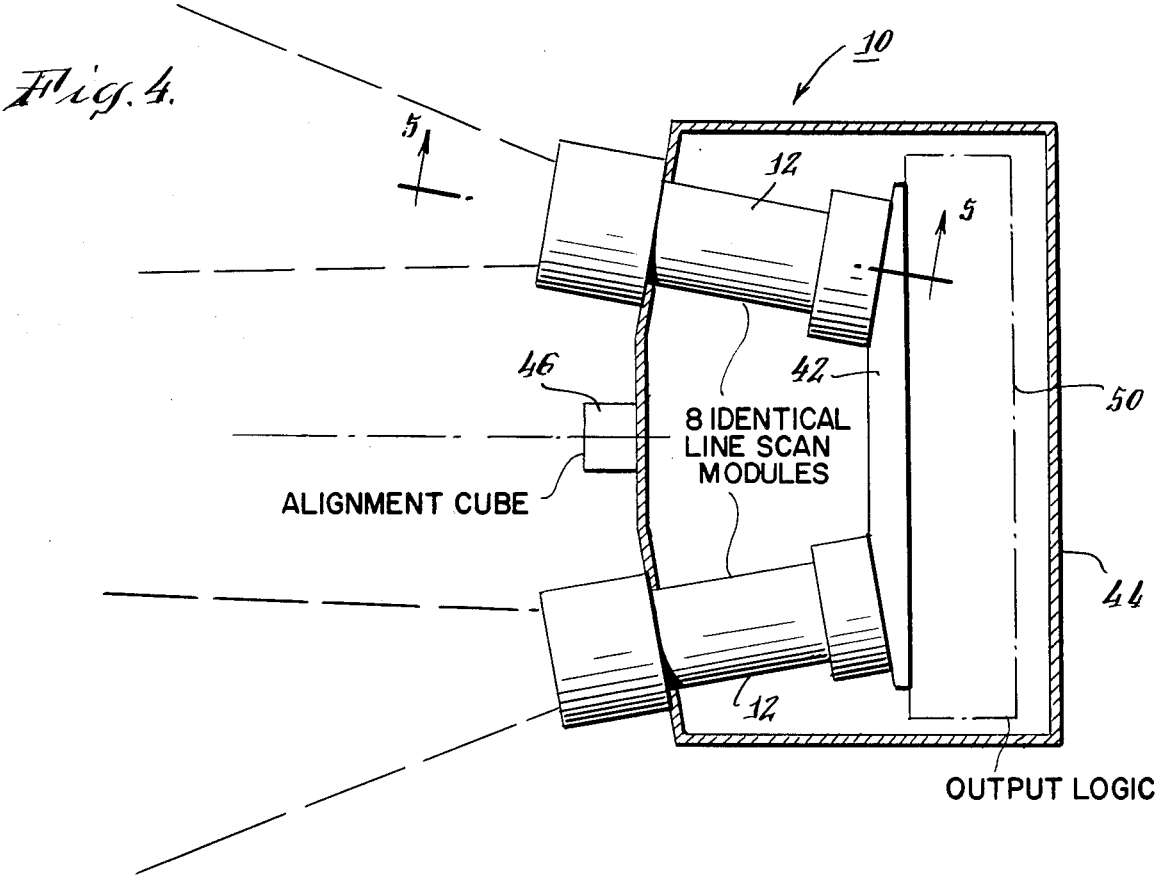
FIG. 4 is an illustrative embodiment of a horizon sensor system in accordance with the present invention.
Figure 5:
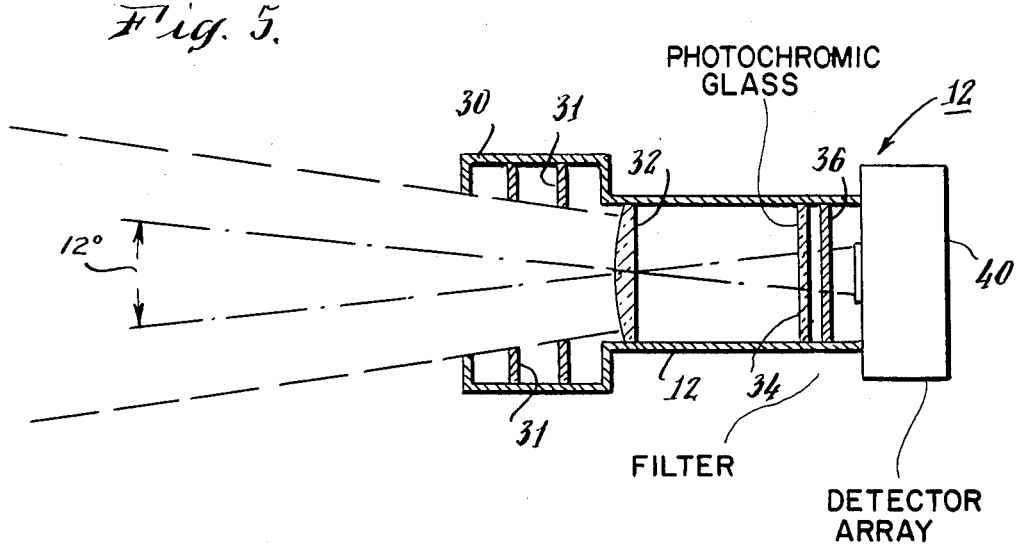
FIG. 5 is a partial cross-sectional view taken along line 5—5 of FIG. 4 illustrating a single line scan module which may be utilized in the present invention.

Referring now to FIG. 4, the horizon sensor, referred to generally with the reference character 10, includes a plurality of identical line scan modules 12 which are adapted to produce eight scan lines, 14, 16, 18, 20, 22, 24, 26 and 28, each of which is 12° long for example, as illustrated in FIG. 2. The eight scan lines 14–28 would be produced by eight identical modules 12 one of which is illustrated in FIG. 5. Line scan module 12 comprises a multiple plate baffle 30 which is mounted ahead of an objective lens 32. The plates 31 of the baffle are parallel to the scan plane of each particular module 12. The module 12 may also include a photochromic glass plate 34 which would become opaque when slightly out of focus solar image impinges thereon in order to prevent a direct image of the sun on the detector array. An ultraviolet band pass filter 36 is provided for passing light in the 0.35 micrometers–0.42 micrometers spectral band. A detector array 40 receives the radiation imaged thereon by the objective lens 32 after passing through the band pass filter 36. The detector array 40 may be in the form of a Recticon series H 256 element, linear, self-scan, silicon array. In this particular array subtending 12° as illustrated in FIG. 5, the focal length of the lens 32 would be 1.2 inches with the array being 0.25 inches long with 0.001 inch wide elements. Each element will subtend 0.05° providing an accuracy of plus or minus 0.025°. As will be seen in FIG. 4, the eight line scan modules 12 are mounted on a common mounting plate 42 in a housing 44 having an alignment cube 46 for adjusting and positioning housing 44 in the host space craft or satellite.

Each detector array 40 is self scanned sequentially in a self contained multiplexing and shift register scan drive forming a portion of the monolithic unit within the detector array 40. The output of the detector array 40 is applied to an output logic circuitry 50. Each array 40 has a single line output in which a signal appears as the array is repetitively scanned across the crescent 52 or the fully illuminated earth disc as the case may be. The output logic 50 in the form of a microprocessor processes the signals applied from each detector array 40 which produce digitalized pitch and roll information directly in binary digitalized form with no interpolation necessary. Based on the absolute value of the earth's radiance against dark space, combined with the sharp signal rise or decay of the true horizon edge as compared to the terminator, the true space-earth line visible horizon can be unambiguously defined by the microprocessor 50. Only two of the edges are required to define the center of the earth at synchronous altitude. Therefore, if the sun is imaged on one of these linear arrays, that array will saturate and will not be used in the pitch and roll attitude determination. However, even where the sun is on the horizon and in the field of view of one of the arrays two adjacent arrays will be able to detect the crescent horizon and locate the earth center.

Alternatively, instead of using eight modules, four may be utilized, for example, a Reticon H series 2048 element, linear, self-scan array having 2048 elements on 15 micrometer centers. The length of the array would cover approximately 3 centimeters subtending 42° to cover the plus or minus 12° linear range illustrated in FIG. 2. In this case four optical heads would be utilized and would be situated to produce an asterisk scan pattern with four scans oriented so that their scan planes are situated 45° apart around the yaw axis i.e., the line to the center of the earth. Other detector arrays may also be utilized for example, Fairchild CCD-143 or any other suitable form of linear arrays which are self scanning.

Accordingly, a visible-ultraviolet horizon sensor has been described which has no moving parts and which may utilize space tested parts thereby cutting production cost while producing a high off-null readout accuracy. The use of commercially available space tested parts provides a sensor which is low in cost with great accuracy. The use of the visible-ultraviolet scatter radiation for horizon sensing purposes at geosynchronous altitudes provides a reliable, accurate and improved type of sensor for the satellites which orbit at these altitudes.

Although the present invention is described using a solid state detector array which is self scanned electronically thus requiring no mechanically moving parts which is the preferred form, other scanning type embodiments using other detectors sensitive to radiation in the blue-UV region may be utilized. For example, photomultiplier tubes which are very sensitive in the visible-UV range used in the present invention may be scanned over the horizon from synchronous altitudes using a scanner of the type described in U.S. Pat. No. 4,328,421, which is assigned to the assignee of this invention.

Since other changes and modifications varied to fit particular operating requirements and environments will be apparent to those skilled in the art, the invention is not considered limited to the examples chosen for purposes of illustration and includes all changes and modifications which do not constitute a departure from the true spirit and scope of this invention as claimed in the following claims and equivalents thereto.

What is claimed is:

1. A visible-UV horizon sensor for providing attitude information at geosynchronous altitudes from a satellite comprising:
   a plurality of detector means selectively responsive to scattered sunlight in the visible and ultraviolet spectral bands,
   means for directing the fields of view of said detector means over the earth's disc at a plurality of locations whereby said detector means generate electrical signals in response to the intensity of visible and ultraviolet radiation from the crescent or fully illuminated earth disc,
   circuit means having said electrical signals from said detector means applied thereto for producing attitude information for said satellite providing the satellite's position with respect to the earth.

2. The visible-UV horizon sensor as claimed in claim 1 having a filter means positioned to transmit to said detector means radiation from 0.35 micrometers–0.42 micrometers.

3. The visible-UV horizon sensor as claimed in claim 1 wherein said plurality of detector means comprises a plurality of linear arrays which are positioned in the satellite to provide radial scan lines across the earth's horizon.

4. The visible-UV horizon sensor as claimed in claim 3 having four linear detector arrays forming four equally spaced radial scan lines across the earth's horizon.

5. The visible UV-horizon sensor as claimed in claim 3 having eight linear detector arrays forming eight equally spaced scan lines across the earth's horizon.

6. The method of providing attitude information for a satellite with respect to the earth comprising the steps of:

viewing the earth's disc at a plurality of equally spaced locations around the earth with detector means sensitive to visible and ultraviolet radiation, directing the field of view of said detector means across the earth's disc at said spaced locations using the crescent or fully illuminated earth disc, detecting visible and ultraviolet radiation from the crescent or fully illuminated earth disc and generating electrical signals with respect to the intensity of visible and ultraviolet energy detected, and using said electrical signals to determine the attitude of said satellite with respect to the earth.

7. The method as claimed in claim 6 including the step of:

filtering radiation applied to said detector means to the range of 0.35 micrometers to 0.42 micrometers.

* * * * *